US009147276B2

(12) United States Patent
Giuffrida et al.

(10) Patent No.: US 9,147,276 B2
(45) Date of Patent: *Sep. 29, 2015

(54) CUT LINE STEERING METHODS FOR FORMING A MOSAIC IMAGE OF A GEOGRAPHICAL AREA

(71) Applicant: Pictometry International Corp., Rochester, NY (US)

(72) Inventors: Frank Giuffrida, Honeoye Falls, NY (US); Stephen Schultz, West Henrietta, NY (US); Robert Gray, Canandiagua, NY (US); Robert Bradacs, Rochester, NY (US)

(73) Assignee: Pictometry International Corp., Rochester, NY (US)

( * ) Notice: Subject to any disclaimer, the term of this patent is extended or adjusted under 35 U.S.C. 154(b) by 114 days.

This patent is subject to a terminal disclaimer.

(21) Appl. No.: 14/045,460

(22) Filed: Oct. 3, 2013

(65) Prior Publication Data

US 2014/0029867 A1 Jan. 30, 2014

Related U.S. Application Data

(63) Continuation of application No. 12/221,571, filed on Aug. 5, 2008, now Pat. No. 8,588,547.

(51) Int. Cl.
| | | |
|---|---|---|
| G06K 9/36 | (2006.01) |
| G06K 9/34 | (2006.01) |
| G06K 9/62 | (2006.01) |
| G06K 9/00 | (2006.01) |
| G06K 9/46 | (2006.01) |
| G06K 9/48 | (2006.01) |
| G06T 11/60 | (2006.01) |
| G06T 3/40 | (2006.01) |
| G06T 7/00 | (2006.01) |
| G09G 5/00 | (2006.01) |
| H04N 9/74 | (2006.01) |

(52) U.S. Cl.
CPC ............... *G06T 11/60* (2013.01); *G06T 3/4038* (2013.01); *G06T 7/0083* (2013.01)

(58) Field of Classification Search
None
See application file for complete search history.

(56) References Cited

U.S. PATENT DOCUMENTS

| | | | | | |
|---|---|---|---|---|---|
| 6,075,905 | A | * | 6/2000 | Herman et al. | 382/284 |
| 7,359,555 | B2 | * | 4/2008 | Porikli et al. | 382/204 |
| 7,778,491 | B2 | * | 8/2010 | Steedly et al. | 382/294 |
| 7,840,032 | B2 | * | 11/2010 | Ofek | 382/113 |
| 7,873,238 | B2 | * | 1/2011 | Schultz et al. | 382/284 |
| 8,233,741 | B1 | * | 7/2012 | Wilson et al. | 382/284 |
| 2005/0063608 | A1 | * | 3/2005 | Clarke et al. | 382/284 |
| 2008/0231700 | A1 | * | 9/2008 | Schultz et al. | 348/144 |

* cited by examiner

*Primary Examiner* — Matthew Bella
*Assistant Examiner* — Jose M Torres
(74) *Attorney, Agent, or Firm* — Dunlap Codding, P.C

(57) ABSTRACT

Systems and methods for creating a ground confidence map of a geographic area, comprising the steps of creating a ground confidence map of a geographic area, the ground confidence map having a plurality of pixels with each pixel corresponding to a particular geographic location; assigning the pixels in the ground confidence map with pixel values indicative of composite ground confidence scores by calculating composite ground confidence scores for the pixel values of common geographic regions within the overlapping portions of the source images within a kernel corresponding to the particular geographic location of the pixels; and storing pixel values indicative of a statistical probability that the geographical location represented by the particular pixels represent the ground.

8 Claims, 10 Drawing Sheets
(6 of 10 Drawing Sheet(s) Filed in Color)

CUT LINE STEERING METHODS FOR FORMING A MOSAIC IMAGE OF A GEOGRAPHICAL AREA

INCORPORATION BY REFERENCE

The present patent application is a continuation of the patent application identified by U.S. Ser. No. 12/221,571, filed Aug. 5, 2008, the entire content of which is hereby incorporated herein by reference.

STATEMENT REGARDING FEDERALLY SPONSORED RESEARCH OR DEVELOPMENT

Not Applicable.

THE NAMES OF THE PARTIES TO A JOINT RESEARCH AGREEMENT

Not Applicable.

REFERENCE TO A "SEQUENCE LISTING," A TABLE, OR A COMPUTER PROGRAM LISTING APPENDIX SUBMITTED ON A COMPACT DISC AND AN INCORPORATION-BY-REFERENCE OF THE MATERIAL ON THE COMPACT DISC (SEE §1.52(E)(5)). THE TOTAL NUMBER OF COMPACT DISCS INCLUDING DUPLICATES AND THE FILES ON EACH COMPACT DISC SHALL BE SPECIFIED

Not Applicable.

BACKGROUND OF THE INVENTION

1. Field of the Invention

In one version, the presently claimed and disclosed invention(s) relate to automated cut-line steering methods for forming an output mosaic image of a geographical area. More particularly, in a preferred embodiment the presently claimed and disclosed invention(s) is an automated cut-line steering method whereby separate, overlapping source images are cut along preferred routes and then combined into at least one single output mosaic image without requiring human intervention. In addition, a method is described and claimed which forms a ground confidence map, useful in cut-line steering, formed by analyzing overlapping portions of geo-referenced source images. The ground confidence map provides an indication of where the overlapping portions of the source images show ground locations. The ground confidence map has a variety of uses such as determining preferred routes where individual source images are to be cut or correcting light detection and ranging data (commonly known in the art as LIDAR). When used to determine preferred routes, the ground confidence map maintains a high level of visual accuracy when the source images are combined to form at least one single output mosaic image. The at least one single output mosaic image is visually pleasing and geographically accurate.

2. Background of the Art

In the remote sensing/aerial imaging industry, imagery is used to capture views of a geographic area and to be able to measure objects and structures within the images as well as to be able to determine geographic locations of points within the image. These are generally referred to as "geo-referenced images" and come in two basic categories:

1. Captured Imagery—these images have the appearance they were captured by the camera or sensor employed.
2. Projected Imagery—these images have been processed and converted such that they conform to a mathematical projection.

All imagery starts as captured imagery, but as most software cannot geo-reference captured imagery, that imagery is then reprocessed to create the projected imagery. The most common form of projected imagery is the ortho-rectified image. This process aligns the image to an orthogonal or rectilinear grid (composed of rectangles). The input image used to create an ortho-rectified image is a nadir image—that is, an image captured with the camera pointing straight down.

It is often quite desirable to combine multiple images into a larger composite image such that the image covers a larger geographic area on the ground. The most common form of this composite image is the "ortho-mosaic image" which is an image created from a series of overlapping or adjacent nadir images that are mathematically combined into a single ortho-rectified image.

Each input nadir image, as well as the output ortho-mosaic image, is composed of discrete pixels (individual picture elements) of information or data. As part of the process for creating an ortho-rectified image, and hence an ortho-mosaic image, an attempt is made to reproject (move within a mathematical model) each pixel within the image such that the resulting image appears as if every pixel in the image were a nadir pixel—that is, that the camera is directly above each pixel in the image.

The reason this ortho-rectification process is needed is it is not currently possible to capture an image where every pixel is nadir to (directly below) the camera unless: (1) the camera used is as large as the area of capture, or (2) the camera is placed at an infinite distance above the area of capture such that the angle from the camera to the pixel is so close to straight down that it can be considered nadir. The ortho-rectification process creates an image that approximates the appearance of being captured with a camera where the area on the ground each pixel captures is considered nadir to that pixel, i.e. directly below that pixel. This process is done by creating a mathematical model of the ground, generally in a rectilinear grid (a grid formed of rectangles), and reprojecting from the individual captured camera image into this rectilinear grid. This process moves the pixels from their relative non-nadir location within the individual images to their nadir positions within the rectilinear grid, i.e. the image is warped to line up with the grid.

When creating an ortho-mosaic, this same ortho-rectification process is used, however, instead of using only a single input nadir image, a collection of overlapping or adjacent nadir images are used and they are combined to form a single composite ortho-rectified image known as an ortho-mosaic. In general, the ortho-mosaic process entails the following steps:

A rectilinear grid is created, which results in an ortho-mosaic image where every grid pixel covers the same amount of area on the ground.

The location of each grid pixel is determined from the mathematical definition of the grid. Generally, this means the grid is given an X and Y starting or origin location and an X and Y size for the grid pixels. Thus, the location of any pixel is simply the origin location plus the number of pixels times the size of each pixel. In mathematical terms:

$$X_{pixel} = X_{origin} + X_{size} \times \text{Column}_{pixel} \quad \text{and} \quad Y_{pixel} = Y_{origin} + Y_{size} \times \text{ROW}_{pixel}.$$

The available nadir images are checked to see if they cover the same point on the ground as the grid pixel being filled. If so, a mathematical formula is used to determine where that point on the ground projects up onto the camera's pixel image map and that resulting pixel value is then transferred to the grid pixel. During this selection process, two important steps are taken:

When selecting the image to use to provide the pixel value, a mathematical formula is used to select an image that minimizes building lean—the effect where buildings appear to lean away from the camera. This is accomplished in a number of ways, but the most common is to pick the image where the grid pixel reprojects as close to the camera center, and hence as close to that camera's nadir point, as possible.

When determining the source pixel value to use, the ground elevation is taken into account to ensure the correct pixel value is selected. Changes in elevation cause the apparent location of the pixel to shift when captured by the camera. A point on the ground that is higher up will appear farther from the center of the image than a point on the ground in the same location that is lower down. For instance, the top of a building will appear farther from the center of an image than the bottom of a building. By taking the ground elevation into account when determining the source pixel value, the net effect is to "flatten" the image out such that changes in pixel location due to ground elevation are removed.

Because the rectilinear grids used for the ortho-mosaic are generally the same grids used for creating maps, the ortho-mosaic images bear a striking similarity to maps and as such, are generally very easy to use from a direction and orientation standpoint. However, since they have an appearance dictated by mathematical projections instead of the normal appearance that a single camera captures and because they are captured looking straight down, this creates a view of the world to which we are not accustomed. As a result, many people have difficulty determining what it is they are looking at in the image. For instance, they might see a yellow rectangle in the image and not realize what they are looking at is the top of a school bus. Or they might have difficulty distinguishing between two commercial properties since the only thing they can see of the properties in the ortho-mosaic is their roof tops, whereas most of the distinguishing properties are on the sides of the buildings. An entire profession, the photo interpreter, has arisen to address these difficulties as these individuals have years of training and experience specifically in interpreting what they are seeing in nadir or ortho-mosaic imagery.

Since an oblique image, by definition, is captured at an angle, it presents a more natural appearance because it shows the sides of objects and structures—what we are most accustomed to seeing. In addition, because oblique images are not generally ortho-rectified, they are still in the natural appearance that the camera captures as opposed to the mathematical construction of the ortho-mosaic image. This combination makes it very easy for people to look at something in an oblique image and realize what that object is. Photo interpretation skills are not required when working with oblique images.

Oblique images, however, present another issue. Because people have learned navigation skills on maps, the fact that oblique images are not aligned to a map grid, like ortho-mosaic images, makes them much less intuitive when attempting to navigate or determine direction on an image. When an ortho-mosaic is created, because it is created to a rectilinear grid that is generally a map grid, the top of the ortho-mosaic image is north, the right side is east, the bottom is south, and the left side is west. This is how people are generally accustomed to orienting and navigating on a map. But an oblique image can be captured from any direction and the top of the image is generally "up and back," meaning that vertical structures point towards the top of the image, but that the top of the image is also closer to the horizon. However, because the image can be captured from any direction, the horizon can be in any direction, north, south, east, west, or any point in between. If the image is captured such that the camera is pointing north, then the right side of the image is east and the left side of the image is west. However, if the image is captured such that the camera is pointing south, then the right side of the image is west and the left side of the image is east. This can cause confusion for someone trying to navigate within the image.

Additionally, because the ortho-mosaic grid is generally a rectilinear grid, by mathematical definition, the four cardinal compass directions meet at right angles (90-degrees). But with an oblique image, because it is still in the original form the camera captured and has not been re-projected into a mathematical model, it is not necessarily true that the compass directions meet at right angles within the image. Because in the oblique perspective, you are moving towards the horizon as you move up in the image, the image covers a wider area on the ground near the top of the image as compared to the area on the ground covered near the bottom of the image. If you were to paint a rectangular grid on the ground and capture it with an oblique image, the lines along the direction the camera is pointing would appear to converge in the distance and the lines across the direction of the camera is pointing would appear to be more widely spaced in the front of the image than they do in the back of the image. This is the perspective view we are all used to seeing—things are smaller in the distance than close up and parallel lines, such as railroad tracks, appear to converge in the distance. By contrast, if an ortho-mosaic image was created over this same painted rectangular grid, it would appear as a rectangular grid in the ortho-mosaic image since all perspective is removed as an incidental part of the ortho-mosaic process.

Because of these fundamental differences in perspective and appearance, the creation of an ortho-mosaic image by the process described above does not work well for oblique images. Because the camera's optical axis (an imaginary line through the center of the lens or optics that follows the aim of the camera) is typically pointed at an angle of 45-degrees or more from nadir (pointed 45-degrees or more up from straight down), the effects of building lean, elevation differences, and non-square pixels are all exaggerated—effects that are considered negative qualities in an ortho-mosaic image. In the ortho-mosaic industry, requirements are generally placed on the image capture process such that they limit the amount of obliqueness to as little as 5-degrees from nadir so as to minimize each of these negative effects.

In addition, if the admirable properties of an oblique image are to be maintained, namely seeing the sides of structures and the natural appearance of the images, then clearly a process that attempts to remove vertical displacements, and hence the sides of the buildings, and one that warps the image to fit a rectilinear grid is not a viable choice. In order to maintain the admirable qualities of the oblique image, it is may be necessary that the process:

If the oblique perspective is to be maintained, the pixels cannot be aligned to a rectilinear grid, or even a trapezoidal grid. Instead, the pixels are preferably aligned to the natural perspective that a camera captures.

As part of the oblique perspective, the pixels in the image cannot all measure the same size on the ground, as pixels in the foreground of the image cover a much smaller area on the ground than pixels in the background of the image—that is by definition part of the natural perspective of a camera.

Because the pixels are so far from nadir, the effects of building lean become extreme and the standard solutions employed in the ortho-mosaic process do not do an adequate enough job compensating for this effect—new techniques must be developed to better compensate for this effect.

If the effects of changes in elevation are backed out, the resulting image has a very unnatural appearance—the vertical sides of buildings can warp and twist, which is something we are not accustomed to seeing and therefore, when looking at such an image, we have a tendency to "reject" it. Thus, to keep the buildings, structures, and objects within an image looking natural, it is preferable to leave the effects of elevation in the perspective of the image and instead account for it in another manner.

Because of these issues, the common practice in the industry is to provide oblique imagery as a series of individual images. However, some of the same benefits of the ortho-mosaic also apply to an oblique-mosaic (an image created from a collection of overlapping or adjacent oblique images), namely the fact that the mosaic covers a larger geographic area than each or any of the individual images that were used to create it.

SUMMARY OF THE INVENTION

This invention allows for the creation of an output mosaic image that has both a natural appearance and is preferably geo-referenced to maintain the ability to measure and determine geographic coordinates. While the preferred embodiment applies this invention to aerial oblique imagery, the invention will also work with non-aerial oblique imagery captured in a variety of ways, including but not limited to cameras mounted obliquely on a vertical pole, hand-held cameras aimed obliquely, and cameras mounted at oblique angles on an underwater probe. While the preferred embodiment is used for cut-line steering when creating oblique mosaics, this invention will also work for cut-line steering for ortho-mosaics as well using input nadir images. This method, especially when utilizing the ground confidence map, can also be applied to "street side" imagery (images captured horizontally—typically from a moving vehicle or by pedestrians), with the slight modification of using the building fronts in a similar fashion as the ground is used when this invention is used in conjunction with aerial imagery.

In one embodiment, the present invention is a method for automatically steering mosaic cut lines along preferred routes to form an output mosaic image. An area to be represented by the output mosaic image is selected, and then an assignment map having a plurality of pixel assignments corresponding to the output mosaic image is created. The pixel assignments have an initial designation of unassigned. Then, each pixel assignment of the assignment map that intersects the preferred routes is designated as a Preferred Cut Line pixel, which has the effect of dividing the Assignment Map into one or more regions that are bounded by Preferred Cut Line pixels or the edge of the Assignment Map. For each region, one or more source images that completely cover the region are selected, and for each selected source image, a Selection Heuristic is used to determine the quality of coverage, and then each pixel assignment in that region is designated as being assigned to the image with the best heuristic.

For any remaining unassigned regions, two or more source images are selected whose combined area completely covers the region, and for each set of two or more combined images, a Pairing Heuristic is used to determine the quality of coverage. Then each pixel in the region is designated as being assigned to the two or more combined images with the best heuristic.

The Preferred Cut Line pixels are re-designated to match the image assignments of their bounded regions, and then pixel values from the source images corresponding to the pixel assignments are utilized to create the output mosaic image. In one embodiment, this can be accomplished by stepping through each pixel in the Assignment Map and using the stored image assignment to determine which image or images to use for the actual image content of the output mosaic image.

In another aspect, the presently disclosed and claimed invention is directed to a method of cut-line steering by creating a ground confidence map (shown in FIG. 5) of a geographic area. The ground confidence map shows which areas of the overlapping sources images are representative of a ground location and which are not, which minimizes the likelihood that the preferred routes will be steered through a three-dimensional object when forming the output mosaic image.

BRIEF DESCRIPTION OF THE SEVERAL VIEWS OF THE DRAWINGS

The patent or application file contains at least one drawing executed in color. Copies of this patent or patent application publication with color drawing(s) will be provided by the Office upon request and payment of the necessary fee.

DETAILED DESCRIPTION OF THE PRESENTLY DISCLOSED AND CLAIMED INVENTION

Figure 1:
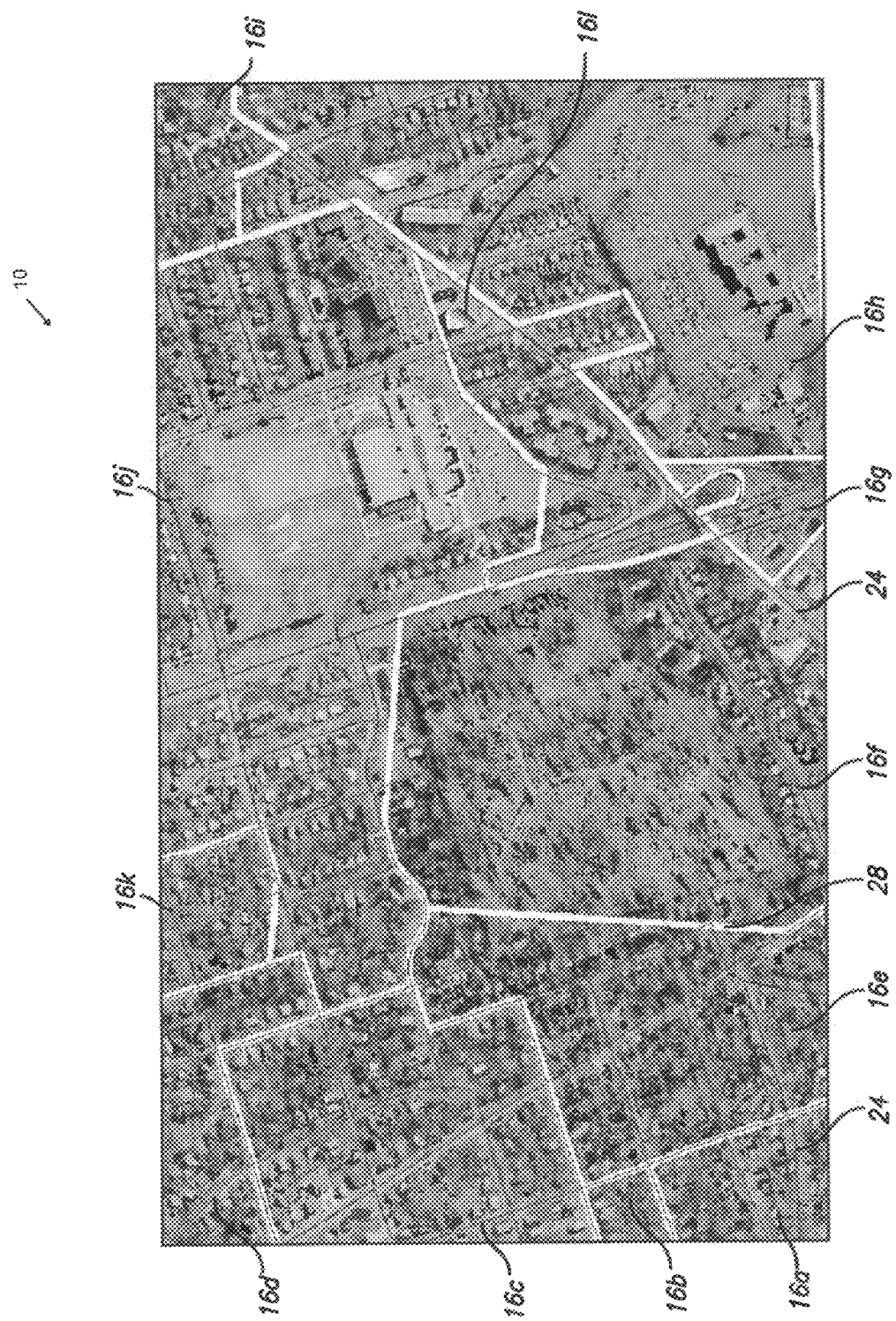
FIG. 1 is an exemplary color output mosaic image constructed in accordance with one embodiment of the present invention and formed from eleven separate source images.

Before explaining at least one embodiment of the invention in detail, it is to be understood that the invention is not limited in its application to the details of construction, experiments, exemplary data, and/or the arrangement of the components set forth in the following description or illustrated in the drawings. The invention is capable of other embodiments or of being practiced or carried out in various ways. Also, it is to be understood that the phraseology and terminology employed herein is for purpose of description and should not be regarded as limiting.

The presently claimed and disclosed invention(s) relate to mosaic images and methods for making and using the same. More particularly, the presently claimed and disclosed invention(s) use a methodology for automatically steering mosaic cut lines along preferred routes to form an output mosaic image whereby separately captured images (referred to hereinafter as "source images") are automatically combined into at least one single mosaic image. The at least one single mosaic image is visually pleasing and geographically accurate. The source images are preferably aerial images and can be either nadir images, orthogonal images, or oblique images.

Referring now to the Figures and in particular to FIG. 1, shown therein and designated by a reference numeral 10 is an exemplary output mosaic image constructed in accordance with one embodiment of the present invention and formed from contributing pixels of twelve separately captured geo-referenced source images, designated by reference numerals 16a-16l. While FIG. 1 depicts the source images 16 as being primarily nadir (vertical) in their orientation, it should be understood that the source images 16 can be oriented in a variety of different ways, including, but not limited to, oblique and horizontal orientations. Preferably every pixel of the geo-referenced source images 16 is associated with a geographic location of a point within the image. The source images 16 can be geo-referenced utilizing any suitable technology. For example, one method of geo-referencing the source images is described in U.S. Ser. No. 10/701,839, filed on Nov. 5, 2003 and entitled "METHOD AND APPARATUS FOR CAPTURING GEOLOCATING AND MEASURING OBLIQUE IMAGES". The white lines on the output mosaic image 10 illustrate the transitions from contributing pixels of the source images 16.

Shown on the output mosaic image 10 are "preferred routes" 24 for "cutting" the source images 16 to form the output mosaic image 10. The preferred routes 24 are selected so as to minimize any adverse effects when transitioning between adjacent source images 16. Preferably, the preferred routes 24 are selected in areas where there are no structures above or below the ground elevation model. This can be accomplished by placing the preferred route 24 down the middle of a street, or by using a ground confidence map as described below. In the exemplary FIG. 1, the preferred routes 24 are generated from street centerline information because streets are generally close to ground level, and do not normally run through vertical structures such as buildings or trees. Thus, if there is a street in the area where two source images 16 overlap, then the transition from contributing pixels from one source image 16 to contributing pixels from an adjacent source image 16 may occur along this street, thus minimizing the adverse effects associated with transitioning between the contributing pixels of the source images 16 in the output mosaic image 10. The street centerlines can be obtained, for example, from vector data files such as TIGER files or other Geographic Information System files. It should be understood that the preferred routes 24 can be generated from other sources besides street centerlines.

The preferred routes 24 and transition lines 28 are shown on the output mosaic image 10 of FIG. 1 for purposes of showing how the output mosaic image 10 was constructed. It should be understood that the preferred routes 24 and the transition lines 28 will not usually be shown in the output mosaic image 10 constructed in accordance with the present invention.

Figure 2A:
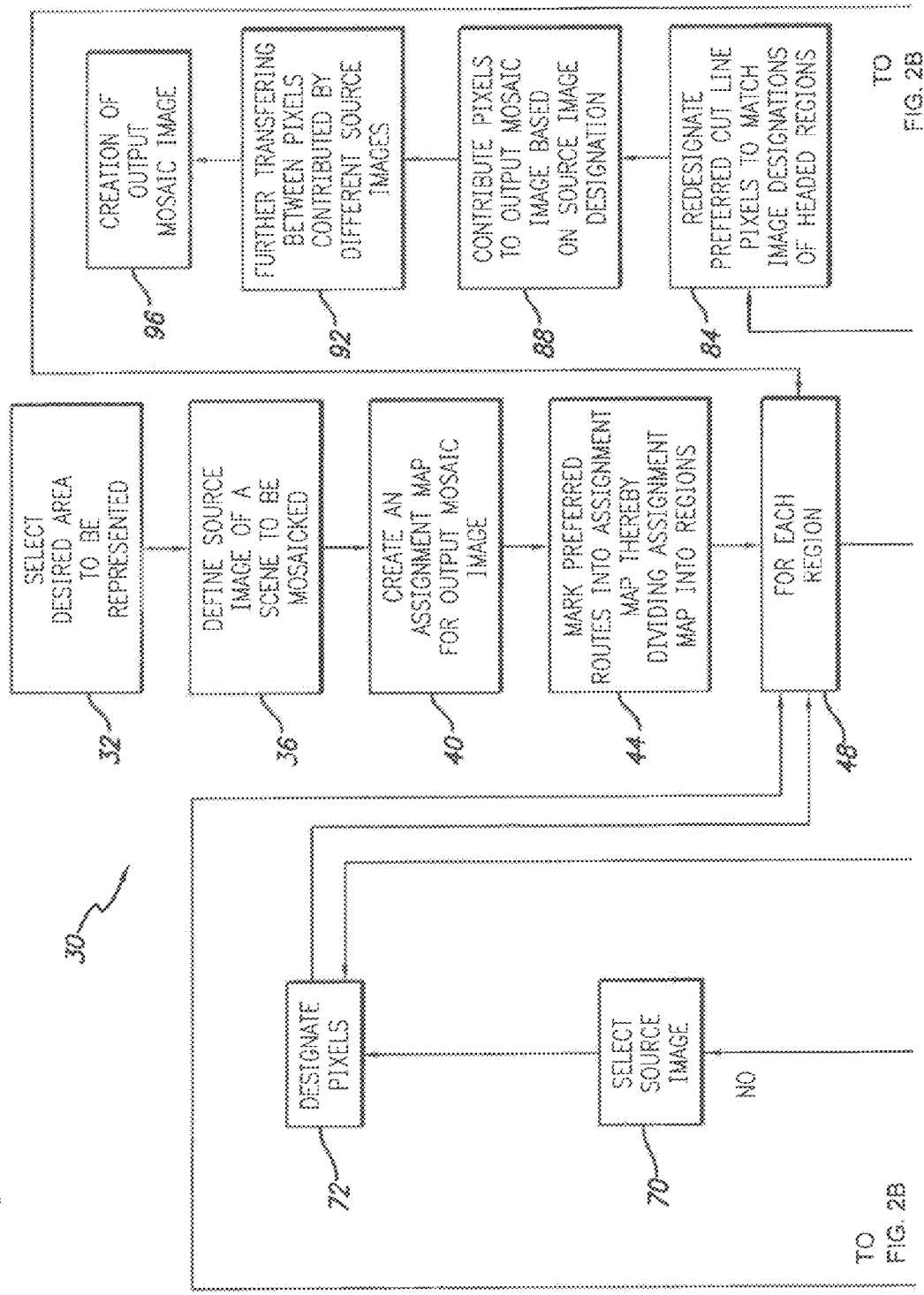
FIG. 2A is a flow chart illustrating an exemplary method for creating the output mosaic image in accordance with the present invention.
Figure 2B:
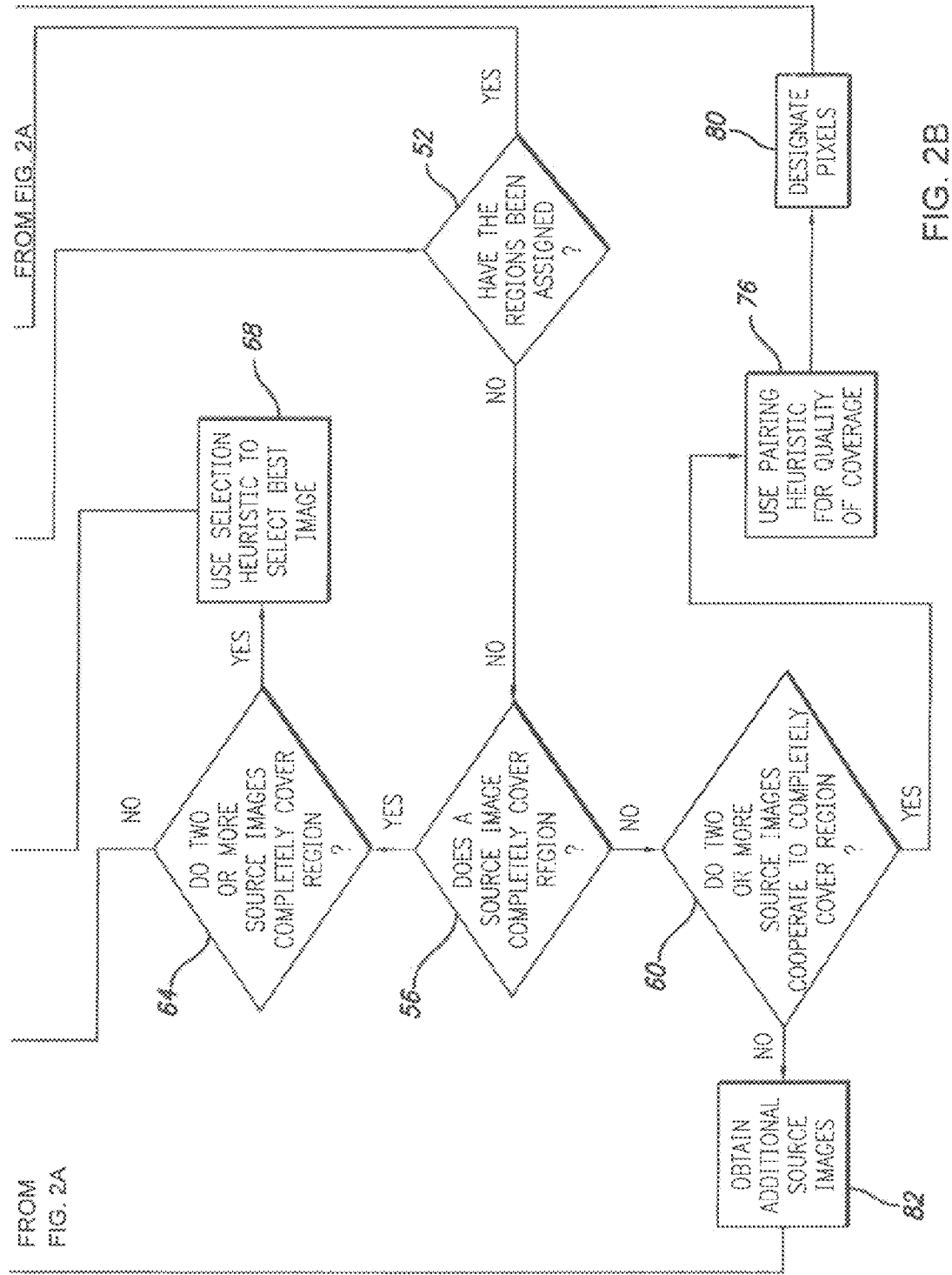
FIG. 2B is a continuation of the flow chart depicted in FIG. 2A.

FIGS. 2A and 2B depict a logic flow chart 30 of an automated cut line steering algorithm constructed in accordance with the present invention and stored on a computer readable medium. The automated cut line steering algorithm is adapted to execute on a computer system or systems and create the output mosaic image 10 preferably without any manual intervention.

Figure 3:
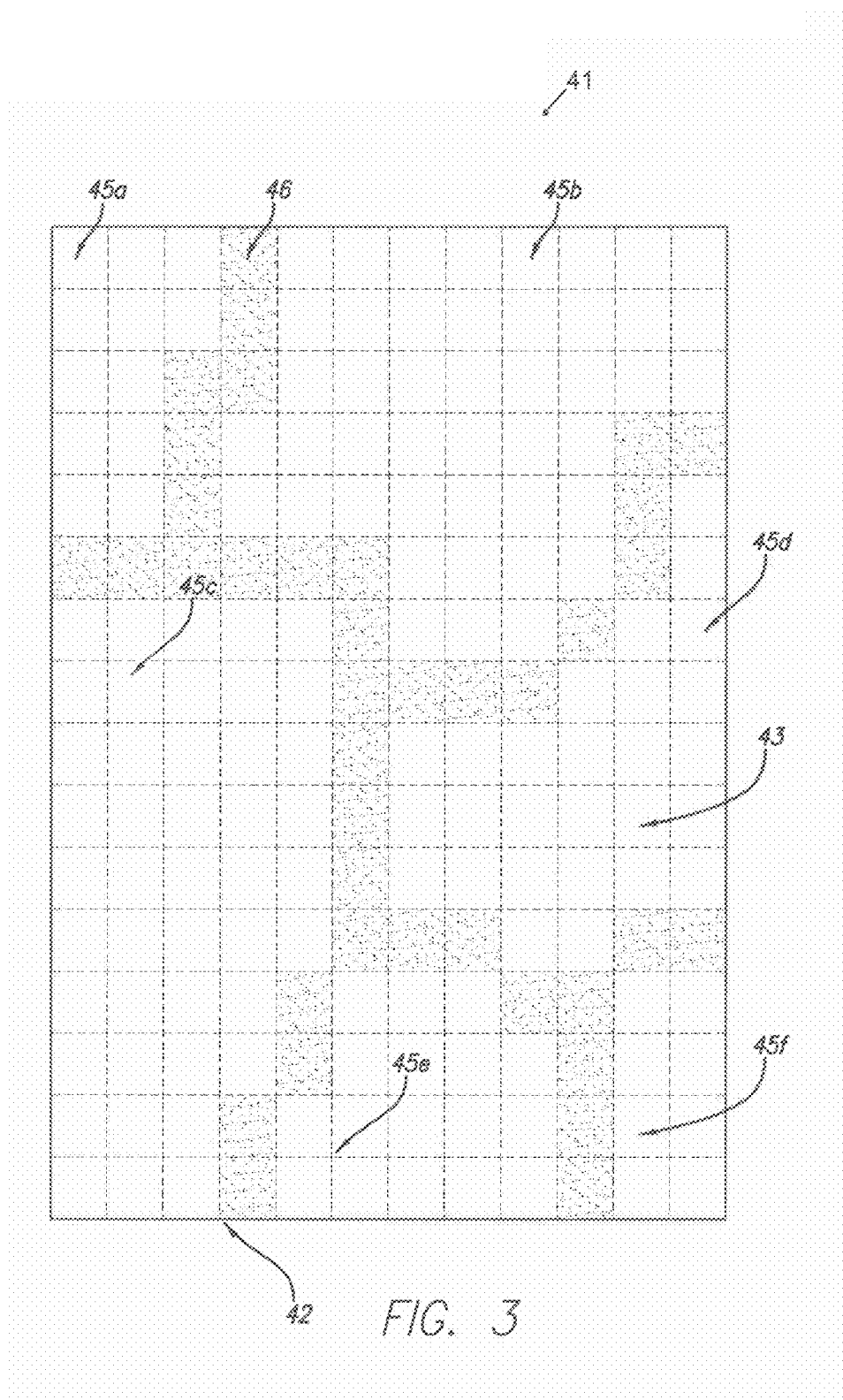
FIG. 3 is an illustration of an exemplary assignment map for the output mosaic image that has been marked with preferred routes for cutting the source images which has the effect of dividing the assignment map into one or more regions that are bounded by the preferred routes or the edge of the assignment map.
Figure 4:
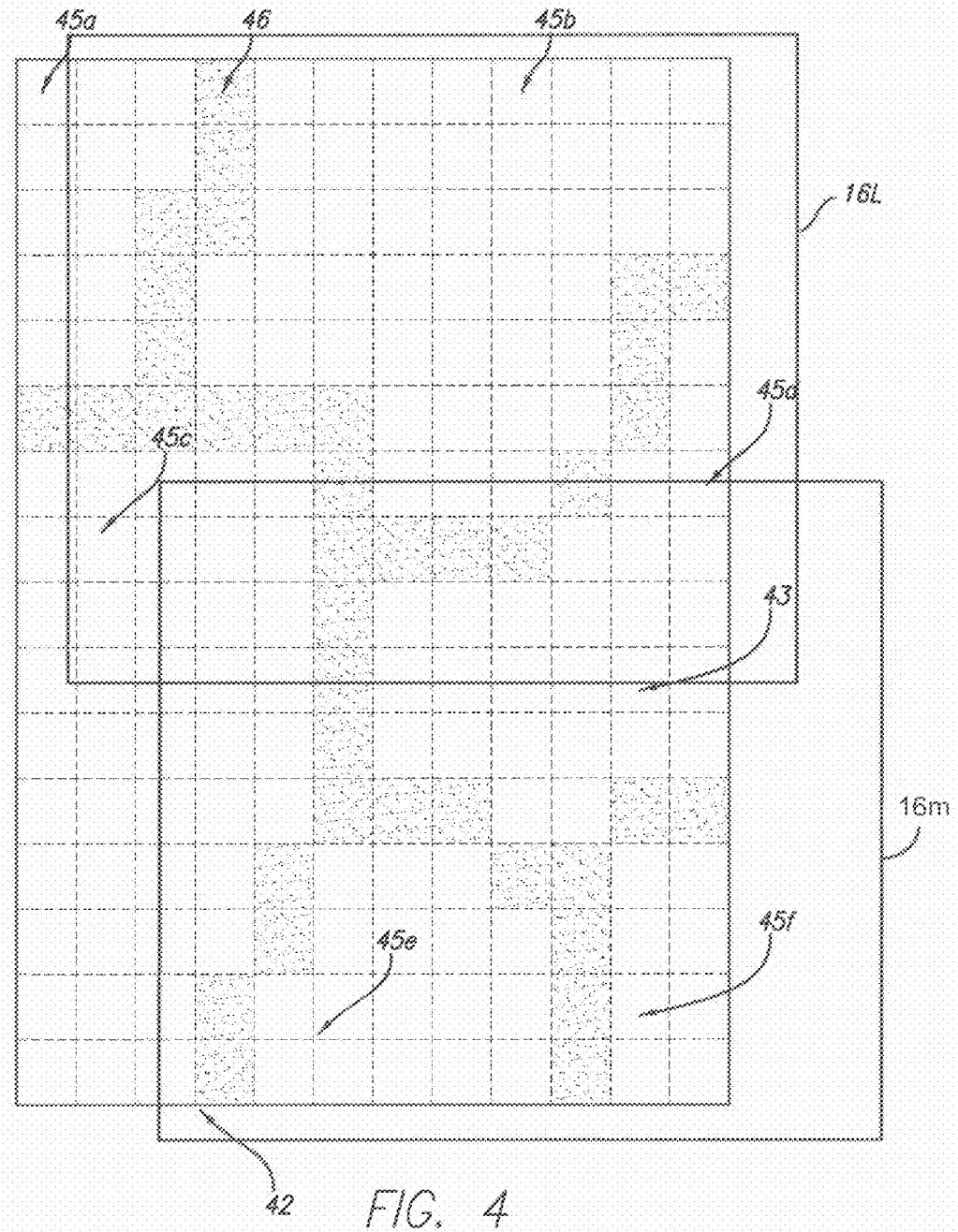
FIG. 4 is a diagrammatic view of the assignment map of FIG. 3 showing coverage of certain regions by three source images.

FIGS. 3 and 4 cooperate to show certain steps in the formation of the output mosaic image 10, and provide visual representations of the logic flow provided in FIGS. 2A and 2B. In general, as indicated by a block 32, a desired area is selected to be represented by one or more output mosaic image(s) 10. The desired area is preferably manually selected, although automated selection of the desired area is also contemplated. Once the desired area is selected, a number of output mosaic images 10 to represent the desired area or a size of each output mosaic image 10 can be selected. For example, the desired area could be Los Angeles County, and the size of each output mosaic image 10 could be specified as one square mile. In this example, the automated cut line steering algorithm would proceed to create an output mosaic image 10 for each square mile of Los Angeles County. Generally, the area to be represented by one or more output mosaic image(s) 10 would be a specific geographical location. However, other areas can also be selected to be imaged into the output mosaic image 10 such as building sides, walls, landscapes, mountain sides and the like.

As shown in the logic flow chart 30 of FIGS. 2A and 2B, once the desired area is selected, the source images 16 are obtained as indicated by block 36. However, it should be understood that the source images 16 can be obtained prior to selection of the desired area, stored on one or more computer readable medium and then accessed. In general, the source images 16 are preferably obtained utilizing one or more real cameras capturing the source images 16 of portions of the desired area and then geo-referenced as discussed above and optionally color-balanced.

The output mosaic image 10 is initially formed by creating an assignment map 41 corresponding to the output mosaic image 10, as indicated by block 40 of FIG. 2A. An exemplary assignment map 41 is shown in FIG. 3. The assignment map 41 is provided with output edges 42 surrounding an assignment area 43 with a plurality of pixels, denoted by the dashed lines and arranged in a rectilinear grid format covering the assignment area 43.

Initially, every pixel of the assignment map 41 preferably has an initial designation of unassigned. Then, as shown in block 44 of the logic flow chart 30, pixels, such as each pixel, of the assignment map 41 that intersect a preferred route 24 is marked as being a "preferred cut line pixel", which has the effect of dividing the assignment map 41 into one or more regions 45 that are bounded by preferred cut line pixels 46 or the output edges 42 of the assignment map 41. By way of example, six regions 45 are depicted in FIG. 3 and labeled with the reference numerals 45a-f. As indicated by block 48, the remaining steps of the logic flow chart 30 are to be performed on each region 45. The preferred cut line pixels 46 cover cut line areas represented by the preferred routes 24 and such cut line areas have a length and a width. It should be noted that the width of the preferred routes 24 can be varied depending upon design factors, such as the amount of feathering to be accomplished between the transitions from adjacent source images.

A region 45 is a contiguous set of pixels bounded by preferred cut line pixels 46 or the output edges 42. In the exemplary assignment map 41 depicted in FIG. 3, the assignment map 41 is divided into six regions that are designated with the reference numerals 45a-45f. The marking of the preferred routes 24 can be accomplished in any suitable manner, such as by drawing a vector representation of the street centerlines onto the assignment map 41 thereby converting the vector representation of the street center lines into a raster representation. Or, these preferred cut line pixels 46 can be generated from raster form of data, such as by using those pixels in a ground confidence image whose ground confidence value meets or exceeds a particular threshold.

It is generally desirable to create a continuous output mosaic image 10. In order to do so, there must be source images 16 for the entire assignment area 43 being depicted in the output mosaic image 10. More specifically, in order to create a preferred embodiment of the mosaic output image 10, all of the regions 45 preferably are assigned at least one source image as indicated in block 52. This means that if multiple source images 16 are being combined to create the output mosaic image 10, the source images 16 must be adjacent or more commonly, overlapping. FIG. 4 shows the exemplary embodiment of the assignment map 41 of FIG. 3 with two overlapping source images (designated with reference numerals 16l-16m) assigned to a portion of the regions 45. While the overlapping source images 16l-16m are depicted in FIG. 4 as being overlapping nadir source images 16, it should be understood that the source images 16 can be in a variety of orientations, including, but not limited to, oblique and orthogonal and/or nadir orientations. In addition, the use of two source images 16 in FIG. 4 is only to accentuate the overlapping assignment of source images 16 to the assignment map 41. As previously described in relation to FIG. 1, the number of sources images 16 used in the assignment can be of any number.

As a result of this overlap, it is common for there to be multiple source images 16 covering the same area on the ground. If multiple captured source images 16 are available for selection, a preferred captured source image 16 is chosen according to the selection criteria described below. In general, the method attempts to minimize the number of source images 16 assigned to a given region 45 in order to minimize the number of cut-lines within the particular region 45. Thus, for each region 45 (as noted above with reference to block 48 of the logic flow), one or more source images 16 are preferably located in an orientation that allows the source images 16 to completely cover the region 45, as indicated by branching decision block 56. When the source images 16 are aerial images, the ground location for the boundaries of the region 45 is determined, which can then be used to ascertain and select which source images 16 contain image data for that particular identified ground location. This is generally done by checking to see if the ground location lies within the image boundaries of a previously captured source image 16. In the example shown in FIG. 4, source image 16l completely covers the region 45b, and the source image 16m completely covers the regions 45e and 45f. If a source image 16 is not located that completely covers the one or more region 45, then the automated cut line steering algorithm determines whether two or more of the source images 16 combine to completely cover the particular region 45, as indicated by branching decision block 60.

As indicated by branching decision block 64 and block 68, if more than one source image 16 is located for a particular region 45, then a Selection Heuristic for quality of coverage can optionally be utilized to determine which source image 16 to select for contributing pixels to the region 45. A variety of Selection Heuristics can be utilized and the following are discussed below by way of example. The Selection Heuristics can be selected from the group comprising (1) which source image 16 is closest to nadir in the area covering the region 45, (2) the first source image 16 located within a region 45, (3) a source image 16 that covers the largest number of surrounding preferred cut line pixels 46, and (4) a source image 16 that covers the largest number of other regions 45. As shown in box 72, once a Selection Heuristic selects a particular source image 16 for the region 45, pixels in the region 45 are designated as being assigned to particular pixels or groups of pixels of the selected source image 16.

As shown in block 70, if it is determined that a source image 16 completely covers a region 45 (branched decision block 56), then the single source image 16 is selected and the pixels in the region 45 are designated as being assigned to particular pixels or groups of pixels of the selected source image 16

As discussed above and shown in branching decision block 60, if a source image 16 is not located that completely covers the region 45 such as region 45d shown in FIG. 4, then the automated cut line steering algorithm determines whether two or more of the source images 16 combine to completely cover the particular region 45 which in the example shown are source images 16l-m. If two or more source images 16 combine to cover the region 45, then the automated cut line steering algorithm uses a Pairing Heuristic to attempt to enhance the quality of coverage of the region 45 as shown in block 76. A variety of Pairing Heuristics can be utilized and the following are discussed below by way of example. The following are examples of Pairing Heuristics that can be utilized.

1. Find the source image 16 that covers the largest number of pixels in the region 45; then, find the source image 16 that covers the largest number of remaining uncovered pixels in region 45; Continue until all pixels are covered.

2. Find source image 16 that is closest to nadir at center point of region 45. Mark all pixels in region 45 covered by this source image 16 as "covered." For each uncovered sub-region, find the source image 16 that is closest to nadir and mark the region 45 pixels covered by that source image 16 as "covered." Preferably, this method is repeated until all pixels have been designated as "covered."

3. Review list of possible source images 16 in order found, marking coverage until all pixels are covered.

4. Expand preferred cut lines until sub-regions are created that are small enough to be covered by a single source image 16. Use a single source image 16 assignment method to select the source image 16 for each of the new regions 45.

5. When selecting source images 16, the relative orientation of the camera that captured the source images 16 can be taken into account, e.g., in order to achieve a more desirable output mosaic image 10, source images 16 that were captured in the same, or nearly the same, relative orientation of the virtual camera, in terms of oblique downward angle and compass direction of the optical axis will be more compatible.

6. The type of camera can also be taken into account when selecting source images 16. That is, if the type of camera utilized the capture the source images 16 is radically different (for instance, a line scanner versus a full frame capture device), it may result in an undesirable resulting output mosaic image 10.

Once the Pairing Heuristic determines the coverage of the region utilizing multiple source images 10, the automated cut-line steering algorithm then designates particular parts of the source images 16 to the pixels in the assignment map 41, as indicated in block 80. This can be accomplished in a variety of manners and the following are examples of how this can be implemented.

1. As the source images 16 are selected, assign all unassigned pixels in the region 45 that are covered by the current source image 16 to that source image 16.

2. Assign pixels from the source images 16 based on each pixel's nearness to nadir.

3. Assign pixels from the source images 16 based on the number of surrounding preferred cut line pixels 46 covered by the source image 16.

As shown in block 82, if two or more source images 16 do not combine to completely cover a region 45 of the assignment map 41, then additional sources images may be obtained for each region that is designated as unassigned or the boundaries of the assignment map 41 can be adjusted.

As shown in block 84, once the pixels of the regions 45 have been designated or assigned to particular pixels or groups of pixels of the source images 16, the preferred cut line pixels 46 are then re-designated to match the source image 16 assignments of their bounded regions 45. As will be discussed below, this can be accomplished in a variety of manners and the method utilized for such re-designation may be dependent on whether or not a single source image 16 covers adjacent regions 45 separated by the preferred cut line pixels 46. The following are examples of how this can be accomplished.

1. If cut line area is only one pixel thick (as shown by way of example in FIGS. 3 and 4), assignment of cut line area could be combined with assignment of adjacent region 45.

2. Reduce cut line area to one pixel thick, and then combine with assignment of adjacent region 45.

3. Work outward from assigned regions 45 into preferred cut line area, assigning region's 45 source image 16 to preferred cut line pixel if it is covered by the source image 16.

4. For each preferred cut line pixel 46, assign pixels from source image 16 that is nearest to nadir, choosing from source images 16 that are assigned to one of the adjacent regions 45 if possible.

As indicated by block 96, once all of the pixels in the assignment map 41 are designated or assigned particular pixels or groups of pixels from the source images 16, the output mosaic image 10 is created by contributing the designated or assigned pixel values to the output mosaic image 10, as indicated by block 88. This can be accomplished in a variety of manners and the following are merely examples of how this can be accomplished.

1. This could be done either with or without feathering (shown in block 92). Feathering makes the sharp changes occurring at the cut line appear more gradual by altering pixel values at the cut line with a blend of the pixel values from each of the source images. For example, if a feathering region along a cut-line between source image 16*l*, for example, and source image 16*m* is 4-pixels wide, then the first pixel in the feathering region might by comprised of 20% of the value from the corresponding pixel in source image 16*l* and 80% of the value from the corresponding pixel in source image 16*m*, the second pixel in the feathering region might by comprised of 40% of the value from the corresponding pixel in source image 16*l* and 60% of the value from the corresponding pixel in source image 16*m*, the third pixel in the feathering region might by comprised of 60% of the value from the corresponding pixel in source image 16*l* and 40% of the value from the corresponding pixel in source image 16*m*, and the fourth pixel in the feathering region might by comprised of 80% of the value from the corresponding pixel in source image 16*l* and 20% of the value from the corresponding pixel in source image 16*m*.

2. The contribution of a source image 16 to a given mosaic pixel could be determined using a nearest neighbor method, or based on averaging or interpolating source image 16 pixel values.

A surface location is preferably assigned to each pixel included in the assignment map 41 so that the output mosaic image 10 will be geo-referenced.

In practice, the methodology disclosed and claimed herein, consists of multiple steps and data transformations that can be accomplished by one of ordinary skill in the art given the present specification. In addition, follow-on work could create new algorithms specifically designed to deal with the complexities of source images 16, including, but not limited to, orthogonal, oblique, and/or nadir source images 16.

The current invention also contemplates a method of cut-line steering by creating a ground confidence map 100 (shown in FIG. 5) of a geographic area. The ground confidence map 100 shows which areas of the overlapping sources images 16 are representative of a ground location and which are not. In the exemplary map 100, the red areas 101 are indicative of ground locations while the blacks pixels 102 are not. In general, the cut line steering method utilizing the ground confidence map 100 increases the statistical probability that preferred routes 24 used to transition between various source images 16 to form the output mosaic image 10 are located on the ground rather than on or through a three-dimensional object, such as, but not limited to, an automobile, building, or tree. This is primarily accomplished by using at least one kernel 104 (shown as 104*a* and 104*b*) to compare the pixel values of overlapping source images 16 to establish the statistical probability that the geographical location represented by pixels in the source images 16 actually represents the ground. While the kernels 104 are shown as being circular in shape in FIGS. 5-9, it should be understood that the kernels can be of any fanciful shape, including, but not limited to square, rectangular, ovular, or triangular.

Figure 6:
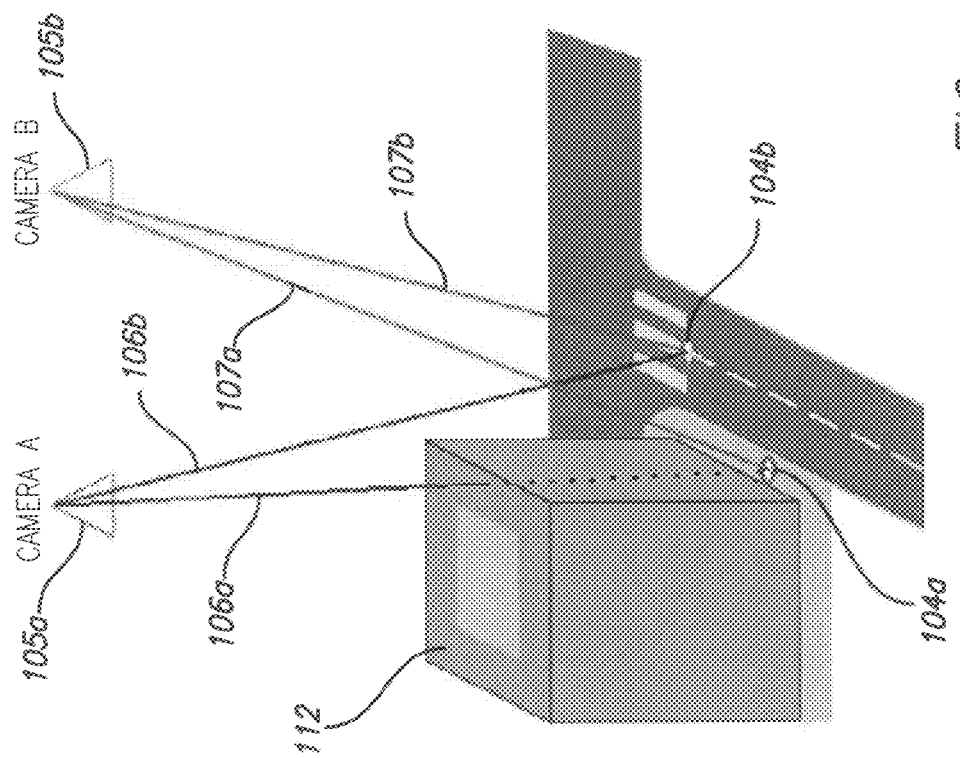
FIG. 6 is a schematic representation of capturing georeferenced, color digital source images highlighting a plurality of kernels located on the ground of a geographic area.

Referring now to FIG. 6, shown therein is a schematic diagram depicting the capturing of geo-referenced source images 16 from a plurality of different vantage points. While FIG. 6 shows the use of two cameras 105*a* and 105*b* for capturing the geo-referenced source images 16 from different vantage points, it should be understood that the capturing can be done from one or more camera(s) 108 as long as the camera(s) 108 capture(s) the source images 16 from a variety of different vantage points. The cameras 105*a* and 105*b* utilize different vantage points 106*a*, 106*b*, 107*a*, and 107*b* to capture source images 16 that are associated with common kernels 104*a* and 104*b*. While the Figures indicate the identification of two kernels 104*a* and 104*b*, it should be understood that the invention contemplates the identification of at least one kernel 104 and is not limited to a specific number of kernels 104 identified within the source images 16.

Figure 7:
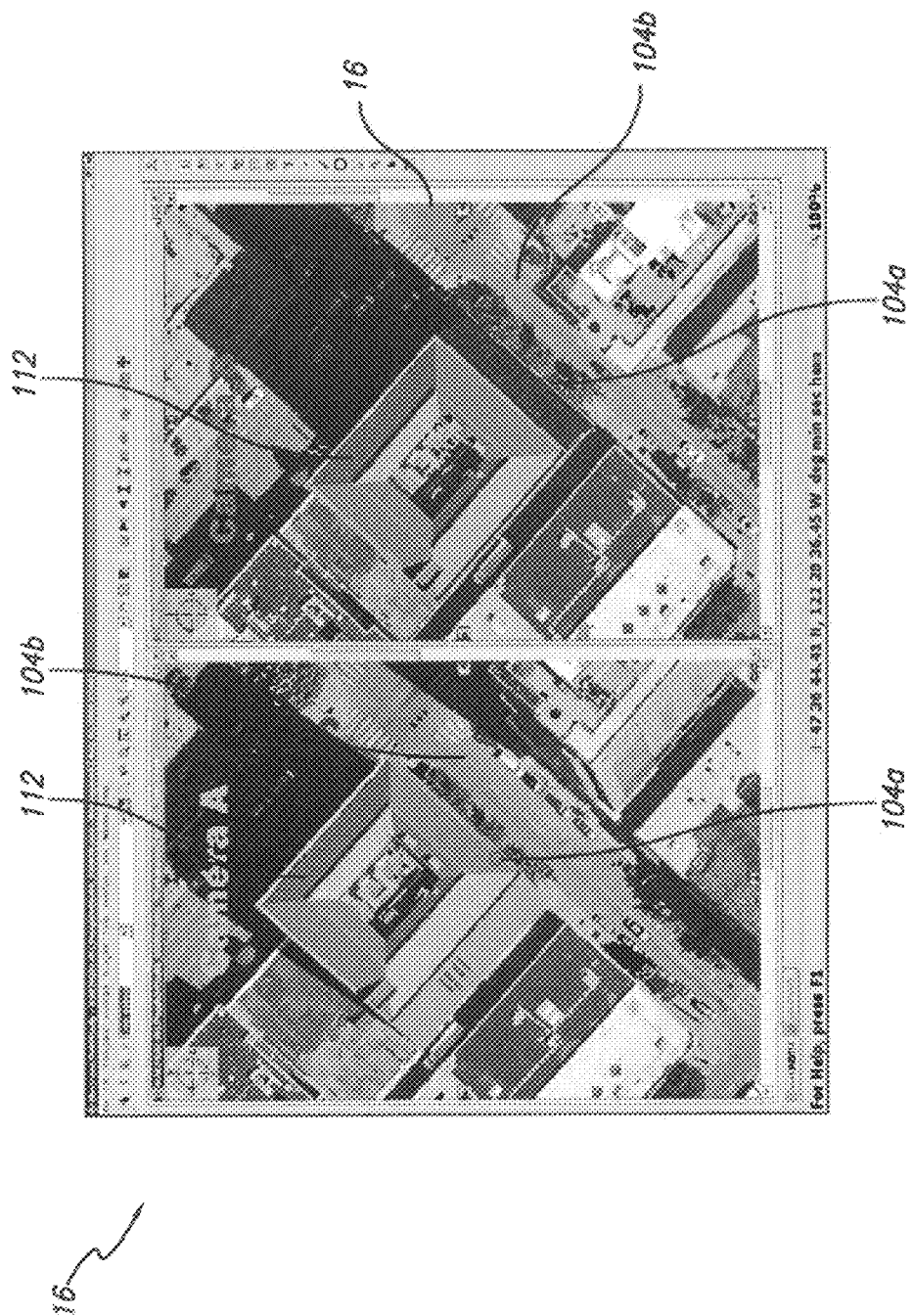
FIG. 7 depicts exemplary color source images captured from different vantage points showing the plurality of kernels depicted in FIG. 6.

When trying to combine source images 16, a problem arises when the overlapping portions of source images 16 captured from different vantage points 106*a*, 106*b*, 107*a*, and 107*b* represent structures that are not on the actual ground. This problem is illustrated by the camera 105*a* in which the vantage points of the camera 105*a* for a plurality of pixels is blocked or shaded by a building 112. The effect of this shading is the capturing of a source image 16 in which the building is shown, but upon geo-referencing the source images 16, the pixels representing the ground location actually show the roof of the building 112 as shown in FIG. 7. That is, FIG. 7 shows two source images 16 which have been captured from two different vantage points. In the source image 16 on the left, the kernel 104a is represented on the roof of the building 112, while in the source image 16 on the right, the kernel 104a is represented on the ground and the pixels are very different in appearance. In contrast, the kernel 104b in both source images is represented on the ground and the pixels within such kernel 104b are similar in appearance. This has deleterious effects when establishing preferred routes 24 for combining source images 16 into an output mosaic image 10 as it is undesirable for the preferred routes 24 to run through the building 112 (or another three-dimensional structure).

Figure 5:
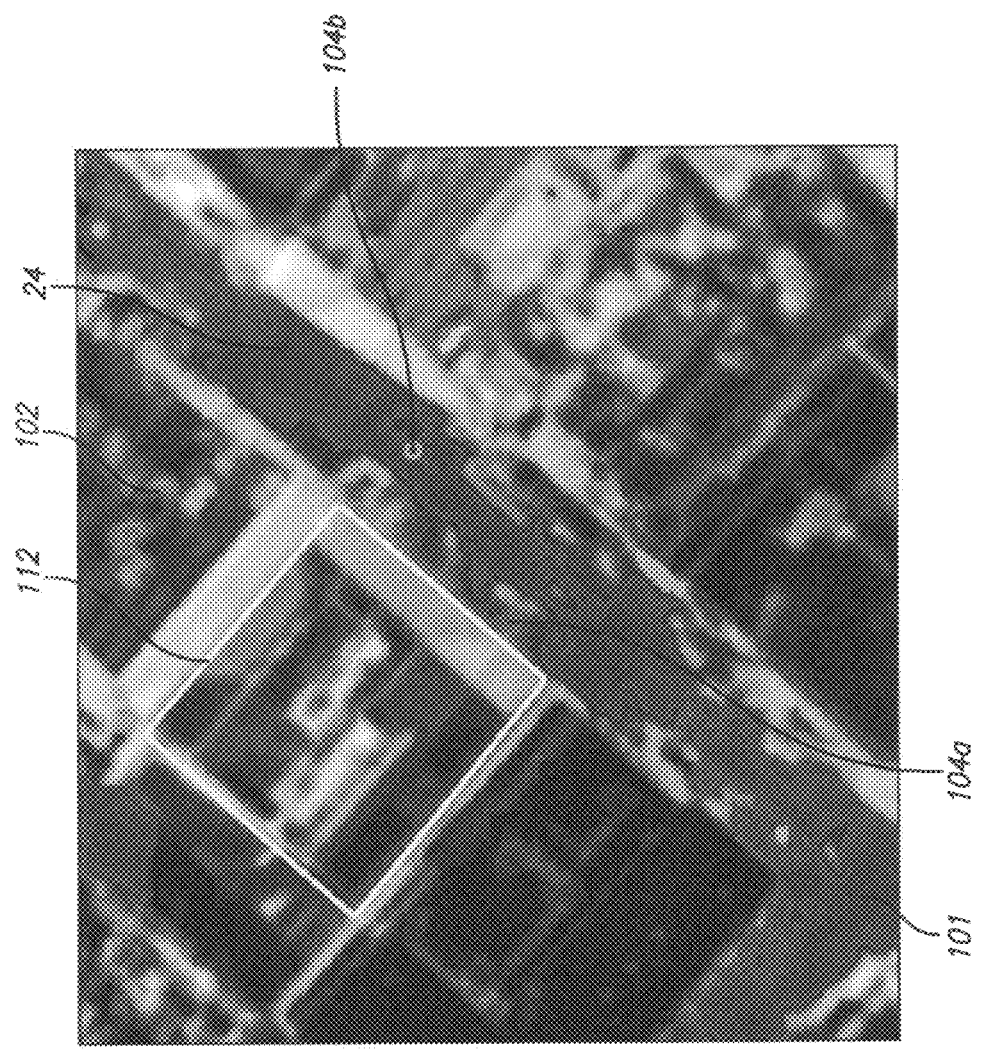
FIG. 5 is an exemplary color ground confidence map constructed in accordance with one embodiment of the present invention.

In one aspect, the present invention is directed to solving this problem by creating the ground confidence map 100 in which the ground confidence is shown in FIG. 5. After the ground confidence map 100 of a geographic region is created, each pixel of the ground confidence map 100 can be assigned with a pixel value indicative of a ground confidence score by determining whether various points of overlapping portions of the source images 16 represent the same physical object. This can be accomplished by calculating a ground confidence score for pixel values of pixels located within the kernel 104 within the overlapping source images 16 corresponding to a particular geographic location of the pixel within the source images 16. The kernel 104 is a small matrix of pixels, usually no larger than 9×9, that is used as an operator during comparison of the overlapping source images 16. The ground confidence score is indicated by analyzing the pixel score for each pixel located within kernel 104 to develop a composite pixel score. For example, the pixel scores can be summed or averaged to develop the composite pixel score for the kernel 104. The pixel score associated with a particular pixel located within the kernel 104 can be calculated in accordance with the following formula:

$$P_s = |P_a - P_b|/(P_a + P_b) \quad (1)$$

where $P_s$ is the pixel score associated with a pixel located within the kernel 104, $P_a$ is the pixel value of a pixel located within the kernel 104 captured by camera 105a (Camera A) and indicative of a particular color, and $P_b$ is the pixel value of the same pixel located within the same kernel 104 captured by camera 105b (Camera B) and indicative of a particular color. So, for instance, if a 3×3 kernel is being utilized, the formula would be:

$$Ps[r, c] = \sum_{i=\pm 1}\sum_{j=\pm 1} |Pa[r+i', c'+j] - Pb[r''+i', c''+j]| \div \quad (2)$$
$$(Pa[r'+i, c'+j] + Pb[r''+i, c''+j])$$

Where Σ denotes summation,
r=row number, c=column number,
Ps[r,c] indicates the pixel score at that particular row and column
Pa[r',c'] indicates the input image A pixel that corresponds to the location of Ps[r,c],
Pb[r'',c''] indicates the input image B pixel that corresponds to the location of Ps[r,c],
Note that r !=r' !=r'' and c !=c' !=c'' (!=means not equals) but that all three locations [r,c], [r',c'] and [r'',c''] map to the same location in the assignment map.
Pa[r'+i,c'+j] indicates the input image A pixel that is offset from the corresponding pixel Pa[r',c']
Pb[r''+i,c''+j] indicates the input image A pixel that is offset from the corresponding pixel Pa[r'',c''].

The size of the kernel 104 (3×3, 3×4, 4×4, 5×5, 4×7, 12×14 or the like) determines how much of a pattern is looked at when determining how well the overlapping source images 16 for a particular pixel match. The larger the kernel, the more precise the pattern match will be. However, the larger the kernel, the longer the algorithm will take to run.

As will be understood by one skilled in the art, the pixels of the geo-referenced overlapping source images 16 may not be perfectly aligned, but are usually within one or two pixels of alignment. To account for this, the above kernel algorithm (Equation 2) is run on the direct corresponding pixel and also on nearby surrounding pixels, for example, within 1-3 pixels of the direct corresponding pixel. Pixels that represent ground locations will usually only be offset by one or two pixels. However, pixels that represent structures that are above the ground will be offset by a significant number of pixels, or will be occluded, and either way, will not get a good match, and therefore a bad ground confidence score, since they will either be two different features (when occluded) or will be two different parts of features (when they are too far away to test the same point in each).

Thus, the kernel algorithm of Equation 2 is run on the direct corresponding pixel and also on nearby surrounding pixels and the pixel score for each run of the kernel algorithm is initially stored, and then the initially stored pixel scores are compared to determine the best score. In the embodiment of Equation 2, the best score will be the lowest score. However Equation 2 can be modified to make the best score the highest score.

The direct corresponding pixel is found by calculating the geographic location of the pixel in the ground confidence map 100 that a ground confidence score (using the origin and pixel size formulas from early on) is being generated for and then determining which pixel(s) that location corresponds to in the overlapping source images 16, using the projective equations of the source images 16. Again, because of the lack of perfectly precise data, the resulting row and column calculated may not correspond to the actual location, which is why the surrounding pixels are checked as well. This is typically done in a 1-pixel or 2-pixel radius from the corresponding pixel location. This radius needs to be large enough to account for the most common pixel location error. However, the larger the radius, the more computer time is necessary. In addition, if too large of a radius is used, then it will start to match for some things off the ground by a small amount, such as automobiles or one-story buildings.

Figure 8:
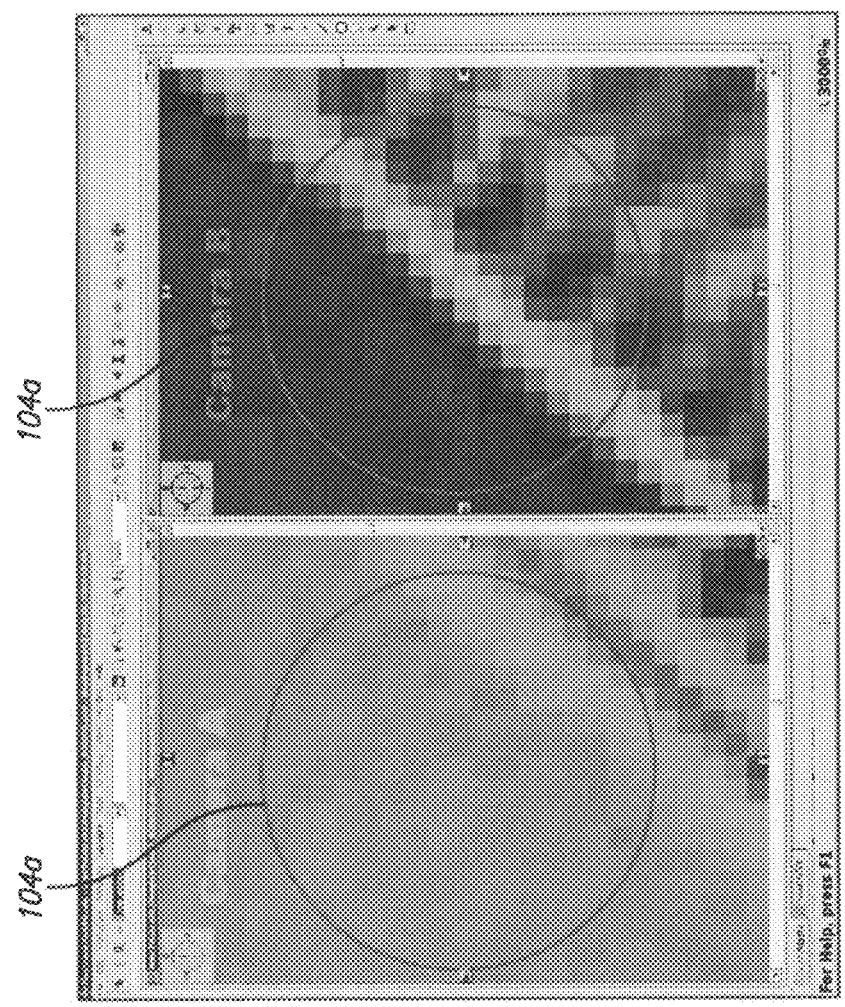
FIG. 8 is an exemplary color pixel image of one of the kernels captured from the different vantage points in FIG. 6.

FIG. 8 depicts a blown up portion 114 of the source images 16 within the kernel 104a taken from vantage point 106a of camera 105a and vantage point 107a of camera 105b. Each pixel within the kernel 104a has a composite pixel score calculated in accordance with Equation 2 above. A comparison of the pixels and composite pixel scores located within the kernel 104a reveals that, depending on which vantage point (106a or 107a) captured the source image 16, the pixels are associated with substantially different colors and thus pixel values. As previously stated, this difference in color is indicative that, while the geo-referenced location of the pixels are the same within the identified kernel 104a, the same object is not being captured or represented within each source image 16. As previously shown in FIG. 6, the difference in color is due to the camera 105a capturing the roof of the building 112 with vantage point 106a rather than the ground as initially projected. By comparing the composite pixel scores associated with each pixel located within the kernel 104 taken from vantage points 106a and 107a, three-dimensional objects, such as the building 112 (or a tree or an automobile), can be identified. Accordingly, the ground confidence score for the kernel 104a indicates that the pixels of both source images 16 within the kernel 104a do not represent the ground. Consequently, the pixel in the ground confidence map 100 would not be a viable candidate for designating as preferred routes 24, as the statistical probability of cutting through a three-dimensional object, such as building 112, are elevated as indicated by the difference in colors of the pixels based on variance of the pixel scores.

Figure 9:
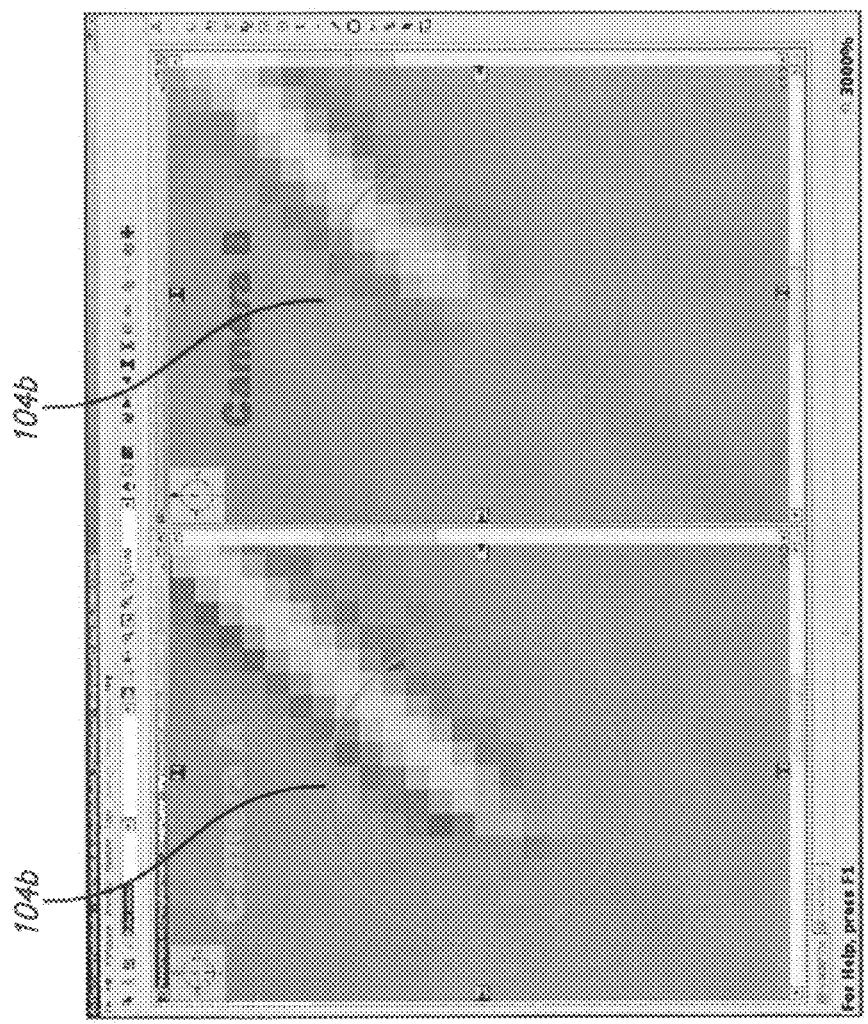
FIG. 9 is an exemplary color pixel image of another kernel captured from the different vantage points in FIG. 6.

FIG. 9 depicts a pixel image 116 of a plurality of pixels located within kernel 104b taken from vantage point 106b of camera 105a and vantage point 107b of camera 105b. As discussed above with reference to FIG. 8, a comparison of the pixels associated with kernel 104b utilizing Equation 2 indicate that such pixels represent the ground. This can be discerned by similarity in pixel scores and colors of the pixels within kernel 104b. Consequently, the pixel in the ground confidence map representing the center of the kernel 104b is a viable candidate for being designated as a preferred route 24 as the statistical probability of cutting through a three-dimensional object, such as the building 112, is minimal.

An important aspect of the invention is the setting of a threshold value which is an acceptable margin of error associated with the composite pixel scores of pixels within a particular kernel 104. While the capturing of source images 16 is extremely precise, the capturing is not exact. It is preferable to create a threshold value for comparing the composite pixel scores, in which the composite pixel scores will be considered similar assuming the pixel does not deviate either above or below the pre-determined threshold value.

After the composite pixel score is determined for each pixel within the ground confidence map 100, each pixel is marked in the ground confidence map 100 by storing a pixel value indicative of the ground confidence score calculated for the particular pixel. Once the ground confidence map 100 has been constructed, the method of cut line steering can be accomplished in the same manner as previously described, except the preferred routes 24 are determined by contiguous pixels indicative of being on the ground as determined by the method described above.

While this invention discusses using captured images as source images 16 for input to the output mosaic image 10, it is not actually required. It is possible to use a projected image as input to this process or even to use another output mosaic image 10 as input to this process.

The one or more assignment maps 41, ground confidence maps 100, and output mosaic image(s) 10 and its corresponding data are then stored on one or more computer readable medium. The one or more assignment maps 41, ground confidence maps 100, and output mosaic image 10 can be stored in any format, including one of many industry standard image formats such as TIFF, JFIF, TARGA, Windows Bitmap File, PNG or any other industry standard format. The georeferencing information about the output mosaic image 10 might also be stored, either in a separate georeferencing file, such as an ESRI World File, or in the same file. For example, the georeferencing information can be stored in the same file through use of metadata tags within the file format, such as the industry standard GeoTIFF tags used in the standard TIFF format.

It should be understood that the processes described above can be performed with the aid of a computer system running image processing software adapted to perform the functions described above, and hardware or software embodying the logic of the processes described herein, as well as the resulting images and data are stored on one or more computer readable mediums. Examples of a computer readable medium include an optical storage device, a magnetic storage device, an electronic storage device or the like. The term "Computer System" as used herein means a system or systems that are able to embody and/or execute the logic of the processes described herein. The logic embodied in the form of software instructions or firmware for steering the cut-lines or creating the ground confidence map 100 may be executed on any appropriate hardware which may be a dedicated system or systems, or a general purpose computer system, or distributed processing computer system, all of which are well understood in the art, and a detailed description of how to make or use such computers is not deemed necessary herein. When the computer system is used to execute the logic of the processes described herein, such computer(s) and/or execution can be conducted at a same geographic location or multiple different geographic locations. Furthermore, the execution of the logic can be conducted continuously or at multiple discrete times. Further, such logic can be performed about simultaneously with the capture of the images, or thereafter or combinations thereof.

Although the foregoing invention has been described in some detail by way of illustration and example for purposes of clarity of understanding, it will be obvious to those skilled in the art that certain changes and modifications may be practiced without departing from the spirit and scope thereof, as described in this specification and as defined in the appended claims below.

What is claimed is:

1. A method for creating a ground confidence map of a geographic area, comprising the steps of:
    creating a ground confidence map of a geographic area, the ground confidence map having a plurality of pixels with each pixel corresponding to a particular geographic location;
    assigning the pixels in the ground confidence map with pixel values indicative of composite ground confidence scores by:
        calculating composite ground confidence scores for the pixel values of common geographic regions within the overlapping portions of the source images within a kernel corresponding to the particular geographic location of the pixels; and
        storing pixel values indicative of a statistical probability that the geographical location represented by the particular pixels represent the ground.

2. The method of claim 1, wherein the pixel values in the ground confidence map are the composite ground confidence scores.

3. The method of claim 1, wherein the ground confidence map is stored on a computer readable medium in an image file.

4. A method, comprising:
    generating a ground confidence map of a geographic area by analyzing overlapping portions of digital source images of the geographic area with such digital source images captured from different vantage points with respect to the geographic area, certain pixels of the ground confidence map indicating a statistical probability that a same geographic area in at least two of the overlapping source images represent the ground;
    identifying contiguous pixels in the ground confidence map indicating that the geographic area in at least two of the overlapping source images represent the ground; and
    determining preferred routes for steering mosaic cut lines utilizing the identified contiguous pixels in the ground confidence map.

5. One or more non-transitory computer readable medium storing logic that when executed on one or more computer performs the functions of:
  creating a ground confidence map of a geographic area, the ground confidence map having a plurality of pixels with each pixel corresponding to a particular geographic location;
  assigning the pixels in the ground confidence map with pixel values indicative of composite ground confidence scores by:
    calculating composite ground confidence scores for the pixel values of common geographic areas within overlapping portions of source images within a kernel corresponding to the particular geographic location of the pixels; and
    storing pixel values indicative of a statistical probability that the geographical location represented by the particular pixels represent the ground.

6. The one or more non-transitory computer readable medium of claim 5, wherein the pixel values in the ground confidence map are the composite ground confidence scores.

7. The one or more non-transitory computer readable medium of claim 5, wherein the ground confidence map is stored on a computer readable medium in an image file.

8. A computer system for determining preferred routes for steering mosaic cut lines to form an output mosaic image, comprising:
  one or more computer readable medium storing logic that when executed perform the functions of:
    generating a ground confidence map of a geographic area by analyzing overlapping portions of digital source images of the geographic area with such digital source images captured from different vantage points with respect to the geographic area, certain pixels of the ground confidence map indicating a statistical probability that a same geographic area in at least two of the overlapping source images represent the ground;
    identifying contiguous pixels in the ground confidence map indicating that the same geographic area in at least two of the overlapping source images represent the ground; and
    determining preferred routes for steering mosaic cut lines utilizing the identified contiguous pixels in the ground confidence map; and
  a computer system executing the logic.

* * * * *

UNITED STATES PATENT AND TRADEMARK OFFICE
CERTIFICATE OF CORRECTION

PATENT NO. : 9,147,276 B2  Page 1 of 1
APPLICATION NO. : 14/045460
DATED : September 29, 2015
INVENTOR(S) : Giuffrida et al.

It is certified that error appears in the above-identified patent and that said Letters Patent is hereby corrected as shown below:

In the Specification:
Column 9, line 62: Delete "161" and replace with -- 16*l* --

Signed and Sealed this
Fifteenth Day of March, 2016

Michelle K. Lee
*Director of the United States Patent and Trademark Office*